United States Patent
Koo et al.

(10) Patent No.: US 8,958,296 B2
(45) Date of Patent: Feb. 17, 2015

(54) ACCESS POINT, TERMINAL, AND METHOD FOR PROCESSING ACCESS CONTROL BASED ON CONGESTION LEVEL OF TRANSMISSION CHANNEL

(75) Inventors: Ki Jong Koo, Daejeon (KR); Do Young Kim, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 247 days.

(21) Appl. No.: 13/112,189

(22) Filed: May 20, 2011

(65) Prior Publication Data

US 2011/0286329 A1 Nov. 24, 2011

(30) Foreign Application Priority Data

May 20, 2010 (KR) .......................... 10-2010-0047682
May 19, 2011 (KR) .......................... 10-2011-0047211

(51) Int. Cl.
*H04W 48/20* (2009.01)
*H04W 48/12* (2009.01)
*H04L 12/26* (2006.01)

(52) U.S. Cl.
CPC ........... *H04W 48/12* (2013.01); *H04L 43/0876* (2013.01); *H04W 48/20* (2013.01)
USPC ........................................................ 370/232

(58) Field of Classification Search
None
See application file for complete search history.

(56) References Cited

U.S. PATENT DOCUMENTS

| | | | |
|---|---|---|---|
| 2005/0030924 A1* | 2/2005 | Yano et al. | 370/332 |
| 2005/0052995 A1* | 3/2005 | Gu et al. | 370/230 |
| 2005/0144306 A1* | 6/2005 | Hart et al. | 709/232 |
| 2007/0064634 A1* | 3/2007 | Huotari et al. | 370/310 |
| 2007/0263588 A1* | 11/2007 | Sathath et al. | 370/349 |
| 2008/0102852 A1* | 5/2008 | Du et al. | 455/453 |
| 2010/0091669 A1* | 4/2010 | Liu et al. | 370/252 |
| 2011/0235570 A1* | 9/2011 | Seo et al. | 370/315 |

FOREIGN PATENT DOCUMENTS

| | | |
|---|---|---|
| KR | 1020050063216 | 6/2005 |
| KR | 10-0645521 | 11/2006 |
| KR | 10-0691442 | 3/2007 |
| KR | 1020100053399 | 5/2010 |
| WO | 2010/056019 A2 | 5/2010 |

\* cited by examiner

*Primary Examiner* — Chirag Shah
*Assistant Examiner* — Rina Pancholi
(74) *Attorney, Agent, or Firm* — Nelson Mullins Riley & Scarborough LLP

(57) ABSTRACT

An access point (AP) measures a congestion level of a transmission channel representing a collision probability between frames at a channel busy duration and transmits the congestion level to a terminal. Therefore, the terminal extracts a congestion level that is included in a frame that is received from the AP through a scan process for searching for an AP to which the terminal is to connect. The terminal selects an AP to connect from at least one AP based on the extracted congestion level of the transmission channel.

12 Claims, 9 Drawing Sheets

FIG.9

ACCESS POINT, TERMINAL, AND METHOD FOR PROCESSING ACCESS CONTROL BASED ON CONGESTION LEVEL OF TRANSMISSION CHANNEL

CROSS-REFERENCE TO RELATED APPLICATION

This application claims priority to and the benefit of Korean Patent Application No. 10-2010-0047682 and 10-2011-0047211 filed in the Korean Intellectual Property Office on May 20, 2010 and May 19, 2011, the entire contents of which are incorporated herein by reference.

BACKGROUND OF THE INVENTION (a) Field of the Invention

The present invention relates to an access point (AP), a terminal, and a method for performing AP access control in consideration of a congestion level of a transmission channel.

(b) Description of the Related Art

A presently used general-purpose wireless local area network (WLAN) terminal, for example, a laptop computer having a WLAN function and a mobile terminal, i.e., a smart phone having a WLAN function selects an AP to connect in order to use a WLAN service.

In this case, the WLAN terminal selects an AP to connect based on intensity information of a signal that is received from the AP. Therefore, the WLAN terminal does not consider how many terminals are connected within a basic service set (BSS) range that the AP services. Further, the WLAN terminal selects an AP without information on a traffic load level of the AP by traffic that is generated by the connected terminal.

In a case where wireless output signal intensity of the AP is high and a traffic load is high, when the terminal selects a corresponding AP based on only wireless signal intensity, a situation in which smooth service when the terminal attempts to receive cannot be received because of a traffic load that is applied to the AP may occur.

In this way, in a case where the terminal attempts to connect to the AP, when it is determined whether to connect to the AP based on intensity of a signal that is simply transmitted from the AP, although a channel situation of the AP is congested, an additional terminal is connected to the AP and thus a congestion situation may be further aggravated.

Further, a method has been suggested in which, after an AP that is to connect is conventionally preferentially selected by signal intensity from the AP, the AP is again selected according to the number of terminals that are connected to the AP.

However, a problem of the method is that it is does not determine whether a connected terminal is presently being serviced. Further, because the kind of traffic occurring is not determined, for example, whether traffic is voice, simple web surfing, or video streaming, the quantity of traffic that is applied to an AP cannot be estimated.

However, a traffic load that is applied to the AP may be represented in various forms according to the kind of a service that a connection terminal performs.

For example, when an AP operates at 11 Mbps in an 802.11b mode, the number of terminals that can connect for voice over WLAN (VoWLAN) and guarantee appropriate voice quality is 10 or less, but the number of terminals for simple web surfing far surpasses 10.

Therefore, even if only the predetermined number of terminals that are simply connected to one AP are distributed to the predetermined number, traffic that is applied to the AP cannot be appropriately distributed.

SUMMARY OF THE INVENTION

The present invention has been made in an effort to provide an AP, a terminal, and a method having advantages of performing AP access control in order for a user to select an AP using a congestion level indication of a transmission channel representing a traffic load level of the AP as well as signal intensity information that is received from an AP.

An exemplary embodiment of the present invention provides an access point (AP). The AP includes a measuring unit that measures a congestion level of a transmission channel representing a collision probability between frames at a channel busy duration, and a broadcasting unit that includes the congestion level of the transmission channel in a beacon frame and that broadcasts the beacon frame to a terminal that belongs within a service range of the AP.

Another embodiment of the present invention provides an AP. The AP includes a measuring unit that measures a congestion level of a transmission channel representing a collision probability between frames at a channel busy duration and a transmission unit that includes a congestion level of a transmission channel in a response frame to an AP search request frame that is received from the terminal and that transmits the response frame to the terminal.

Yet another embodiment of the present invention provides a terminal. The terminal includes a scan unit that receives each frame from at least one AP through a scan process; an extractor that extracts a congestion level of the transmission channel that is measured by the at least one AP that is included in the each frame, wherein the congestion level of the transmission channel represents a collision probability between frames at a channel busy duration; and a selection unit that selects an AP to connect from the at least one AP based on the congestion level of the transmission channel.

Yet another embodiment of the present invention provides a method of performing access control of an AP. The method includes measuring, by the AP, a congestion level of a transmission channel representing a collision probability between frames at a channel busy duration; and transmitting the congestion level of the transmission channel to a terminal.

Yet another embodiment of the present invention provides a method of performing AP access control of a terminal. The method includes receiving each frame from at least one AP through a scan process for searching for an AP to which the terminal is to connect; extracting a congestion level of the transmission channel that is measured by the at least one AP from each frame, wherein the congestion level of the transmission channel represents a collision probability between frames at a channel busy duration, and selecting an AP to connect from the at least one AP based on a congestion level of the transmission channel.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising", will be understood to imply the inclusion of stated elements but not the exclusion of any other elements.

In the entire specification, a terminal may indicate a user equipment (UE), a mobile terminal (MT), a mobile station (MS), a subscriber station (SS), a portable subscriber station (PSS), and an access terminal (AT) and may include the entire function or a partial function of the MT, the MS, the SS, the PSS, and the AT.

Further, an access point (AP) may indicate a base station (BS), a node B, an evolved node B (eNode B), a radio access station (RAS), a base transceiver station (BTS), and a mobile multihop relay (MMR)-BS and may include the entire function or a partial function of the node B, the eNode B, the AP, the RAS, the BTS, and the MMR-BS.

Hereinafter, an AP, a terminal, and a method for performing AP access control in consideration of a congestion level of a transmission channel according to an exemplary embodiment of the present invention will be described with reference to the drawings.

Figure 1:
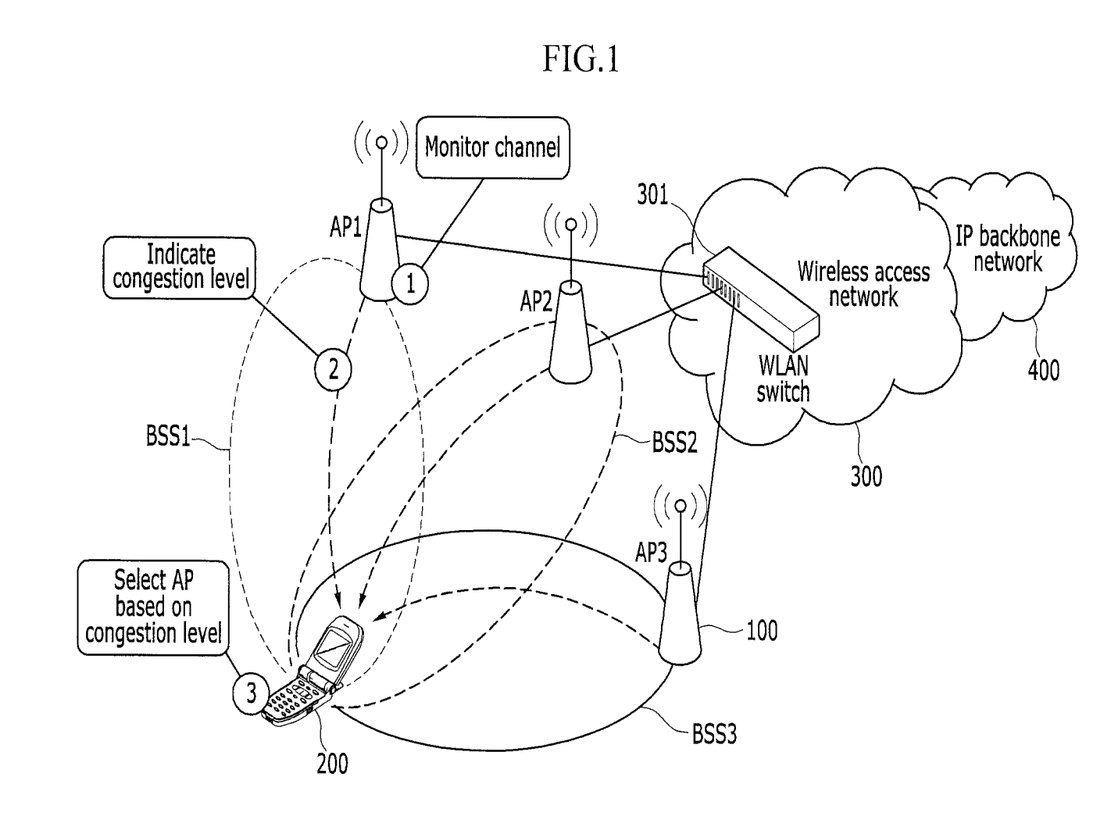
FIG. 1 is a diagram illustrating a configuration of a wireless network according to an exemplary embodiment of the present invention.

FIG. 1 is a diagram illustrating a configuration of a wireless network according to an exemplary embodiment of the present invention.

Referring to FIG. 1, the wireless network includes a plurality of APs 100 exist, and a terminal 200 that selects one of a plurality of APs (AP1, AP2, and AP3) and accesses thereto.

The plurality of APs 100 (AP1, AP2, and AP3) are connected to a wireless LAN (WLAN) switch 301 of a wireless access network 300, and the wireless access network 300 is connected to an IP backbone network 400.

Here, the plurality of APs 100 (AP1, AP2, and AP3) monitor transmission channels BSS1, BSS2, and BSS3, respectively of a basic service set (BSS) of each AP (AP1, AP2, and AP3) (□). The plurality of APs 100 (AP1, AP2, and AP3) measure a congestion level of a transmission channel and broadcast a congestion level indication to the terminal 200 that is positioned within a service range of each AP (AP1, AP2, and AP3) (□). Accordingly, the terminal 200 selects a specific AP to connect based on the received congestion level indication (□).

Hereinafter, a congestion level and measurement of a congestion level will be described in detail with reference to FIGS. 2 and 3.

Figure 2:
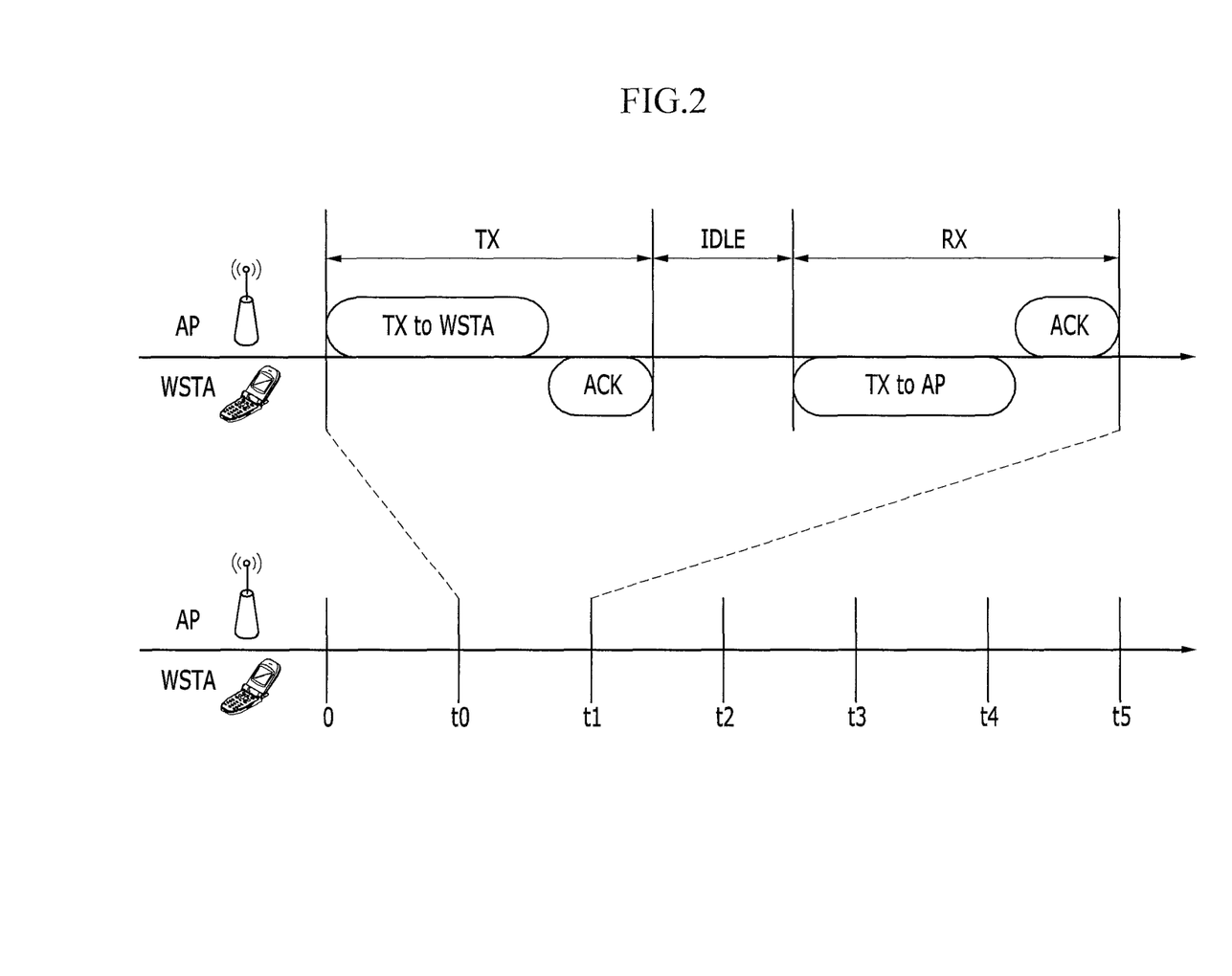
FIG. 2 is a diagram illustrating an example of transmitting a frame between an AP and a terminal according to an exemplary embodiment of the present invention.

FIG. 2 is a diagram illustrating an example of transmitting a frame between an AP and a terminal according to an exemplary embodiment of the present invention.

Referring to FIG. 2, according to the IEEE 802.11 WLAN specification, a transmission channel of a BSS that is formed with the AP 100 and the terminal 200 is divided into a transmission duration TX, a reception duration RX, and an idle duration IDLE according to whether a transmission frame exists.

When the transmission channel is divided into a predetermined time interval Tch and is expressed with t0, t1, t2, . . . , for a Tch time period between t0 and t1, a channel state that is occupied by a transmission frame between the AP 100 and the terminal WSTA 200 is analyzed from an AP viewpoint as follows.

First, the AP 100 transmits frames TX to WSTA to the terminal 200 and awaits an ACK response thereof. The above description corresponds to a frame transmission process from an AP viewpoint.

Thereafter, after a channel is an IDLE state without transmission of a frame, the AP 100 receives frames TX to AP from the terminal 200 and transmits ACK as a response thereof to the terminal 200. The above description corresponds to a frame reception process from an AP viewpoint.

In this case, a frame reception process may be determined that a channel is occupied by another terminal 200 from an AP viewpoint, and this duration may be represented as a channel busy duration. When the AP 100 or another terminal 200 transmits a frame at a channel busy duration, a collision occurs, and a transmission error occurs at a corresponding frame.

Therefore, a congestion level of a channel may be measured by a busy time and an IDLE time of a channel that is measured for a specific time period.

Here, a congestion level of a channel may be expressed as a frame collision probability, and a frame collision probability that is measured at a specific time is defined by Equation 1.

$$\frac{\text{Busy time}}{\text{Busy time} + \text{Idle time}} \quad \text{(Equation 1)}$$

A frame collision probability that is calculated by Equation 1 represents a congestion level of a transmission channel and is broadcasted to the terminal 200 that is connected to the AP 100 through a beacon frame. Further, when the terminal 200, in order to access to the AP 100 transmits a probe request for AP search, a congestion level of a transmission channel is provided to the terminal 200 through a probe response frame.

Figure 3:
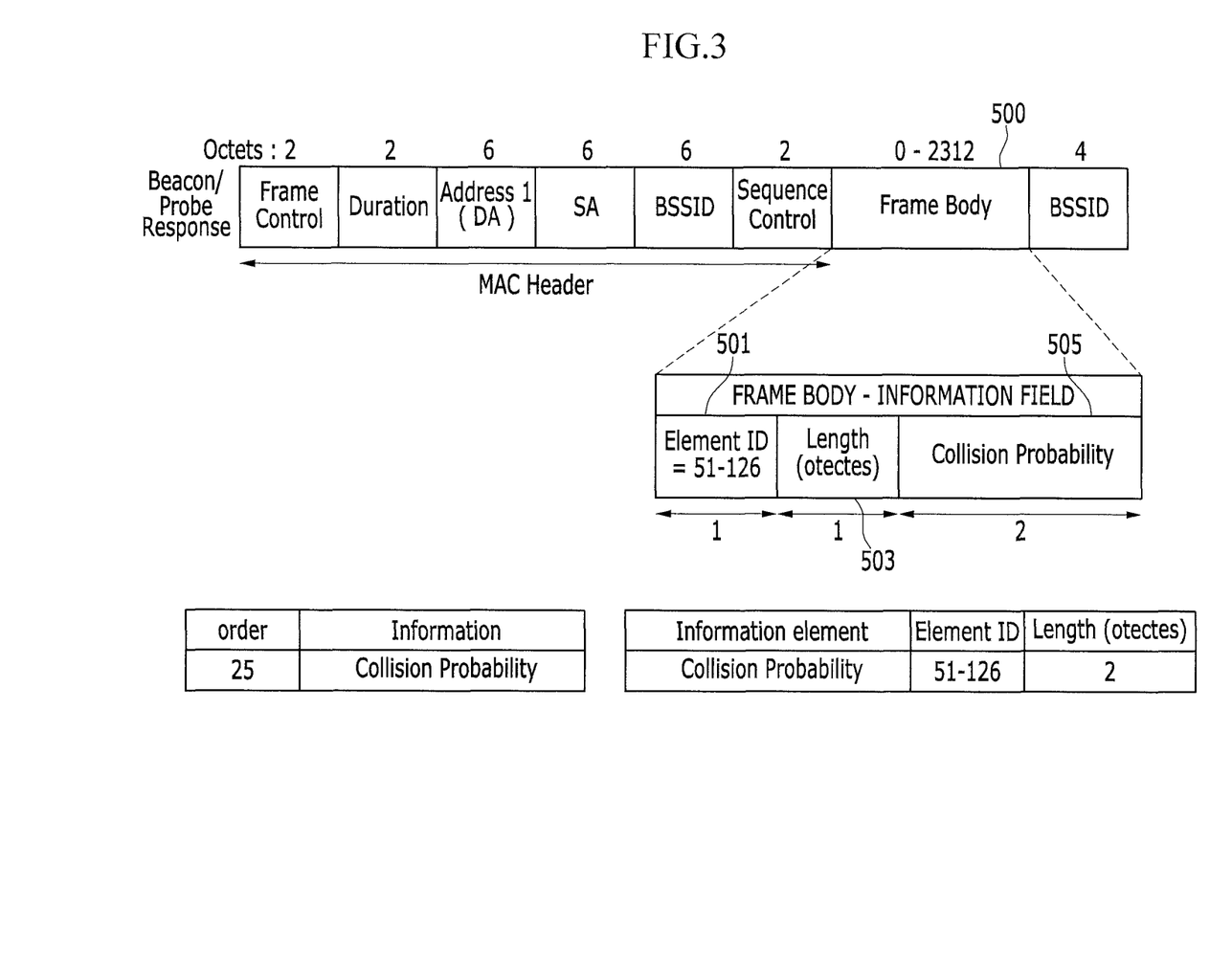
FIG. 3 is a diagram illustrating a frame structure according to an exemplary embodiment of the present invention.

In this case, a beacon frame and a probe response frame including a congestion level of a transmission channel are formed, as shown in FIG. 3.

FIG. 3 is a diagram illustrating a frame structure according to an exemplary embodiment of the present invention.

Referring to FIG. 3, a beacon frame and a probe response frame (hereinafter, referred to as a frame) includes a MAC header field, a frame body field, and a frame check sequence (FCS) field.

Here, the frame body field 500 defines an additional information element for representing a congestion level indication in addition to a previously defined information element.

The added information element uses order=25 that is not defined in a specification based on the IEEE 802.11-2007 specification, and an information name thereof is defined as a collision probability.

Names of an order and information can be adjusted according to a situation. An information element (collision probability) includes an element ID field 501 and a length field 503, the element ID is determined to be 52, and 2 octets are allocated to a length field 505 and the length field 505 represents a collision probability.

A collision probability that is inserted into the length field is input as an integer, and a unit thereof is expressed as 10e-6. Here, the expression method of an element ID and the collision probability can be adjusted according to the situation.

Hereinafter, a configuration of an AP and a terminal that performs AP access control in consideration of a congestion level of the above-described transmission channel and processes of AP access control will be described. In this case, only a configuration that is related to AP access control in consideration of a congestion level of a transmission channel is illustrated.

Figure 4:
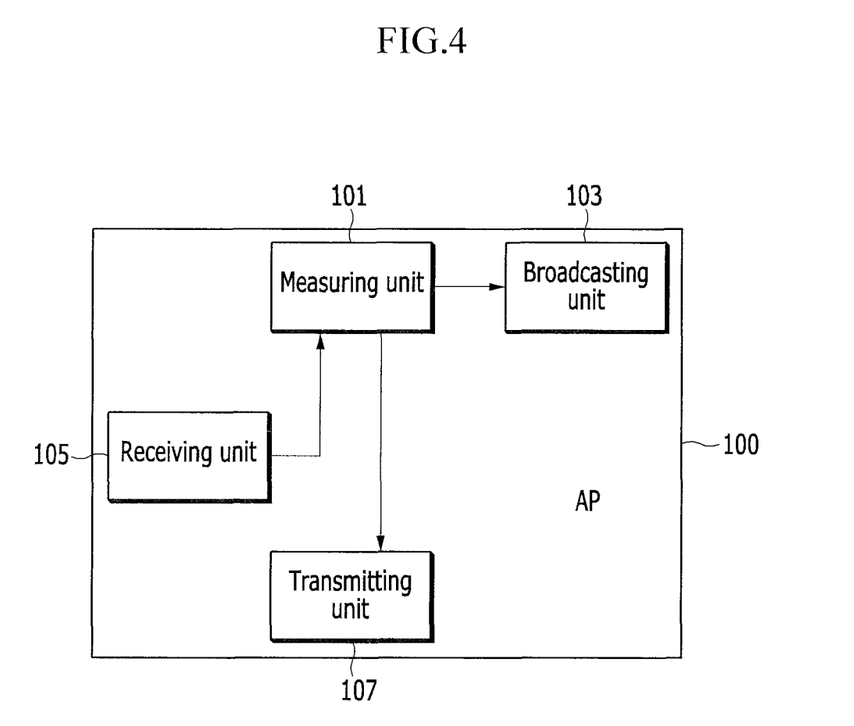
FIG. 4 is a block diagram illustrating a configuration of an AP according to an exemplary embodiment of the present invention.
Figure 5:
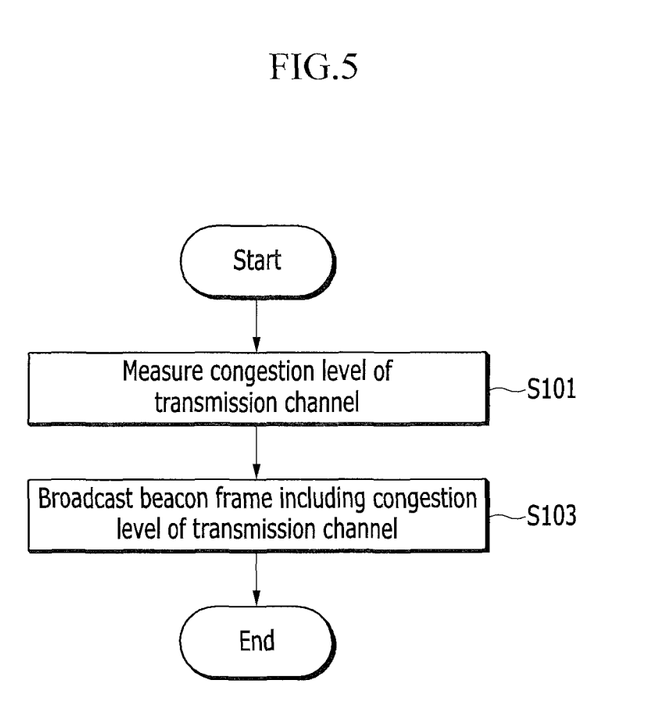
FIG. 5 is a flowchart illustrating a process in which an AP provides information for controlling an AP connection of a terminal according to an exemplary embodiment of the present invention.
Figure 6:
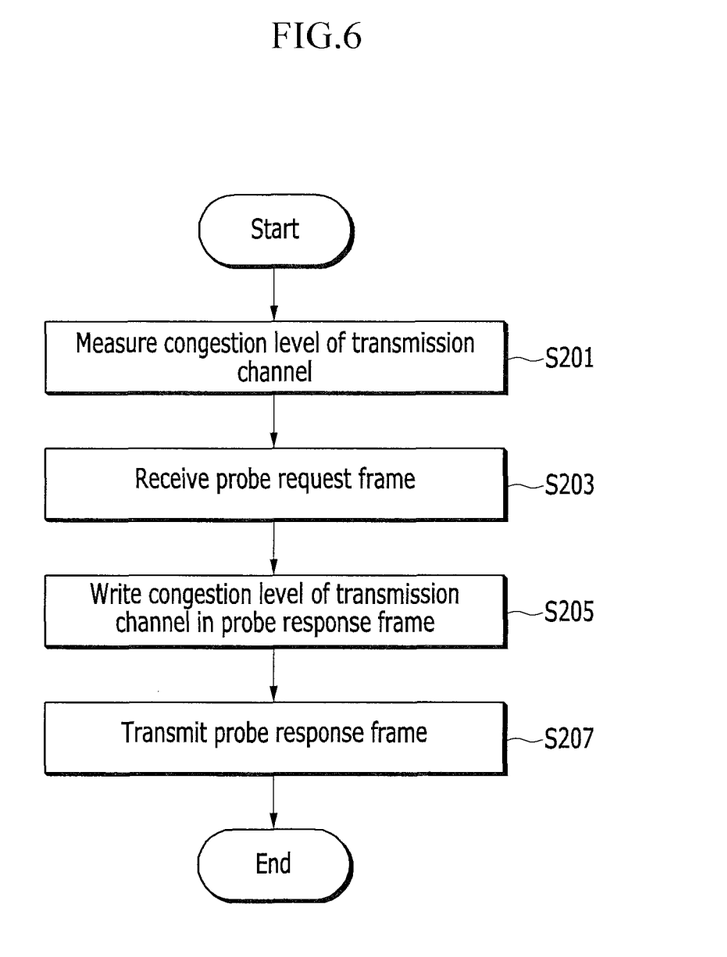
FIG. 6 is a flowchart illustrating a process in which an AP provides information for controlling an AP connection of a terminal according to another exemplary embodiment of the present invention.

FIG. 4 is a block diagram illustrating a configuration of an AP according to an exemplary embodiment of the present invention, FIG. 5 is a flowchart illustrating a process of performing AP access control according to an exemplary embodiment of the present invention, and FIG. 6 is a flowchart illustrating a process of performing AP access control according to another exemplary embodiment of the present invention.

Referring to FIG. 4, the AP 100 includes a measuring unit 101, a broadcasting unit 103, a receiving unit 105, and a transmitting unit 107.

In this case, an AP access control operation of the AP 100 may include two exemplary embodiments, and operations of the two exemplary embodiments are simultaneously performed in parallel or are performed individually. Operations of two exemplary embodiments are described as follows.

First, an exemplary embodiment is described with reference to FIG. 5.

The measuring unit 101 measures a congestion level of a transmission channel (S101). In this case, as shown in FIG. 2, a transmission channel is divided into a transmission duration TX, a reception duration RX, and an idle duration IDLE by predetermined time interval Tch according to a packet transmission state, and a congestion level of a transmission channel is measured with a ratio that a reception duration RX occupies at the remaining time duration, except for a transmission duration.

Thereafter, the broadcasting unit 103 writes a congestion level of a transmission channel that is measured at step S101 in a beacon frame and broadcasts the beacon frame to the terminal 200 that is positioned within a service range of the AP 100 (S103).

Next, another exemplary embodiment is described with reference to FIG. 6.

Referring to FIG. 6, the measuring unit 101 measures a congestion level of the transmission channel (S201), similar to FIG. 5.

Thereafter, the receiving unit 105 receives a probe request frame for an AP search from the terminal 200 (S203).

Thereafter, the transmitting unit 107 receives the congestion level of the transmission channel that is measured at step S201 from the measuring unit 101 and writes the congestion level in a probe response frame (S205), and transmits the probe response frame to the terminal 200 (S207).

Figure 7:
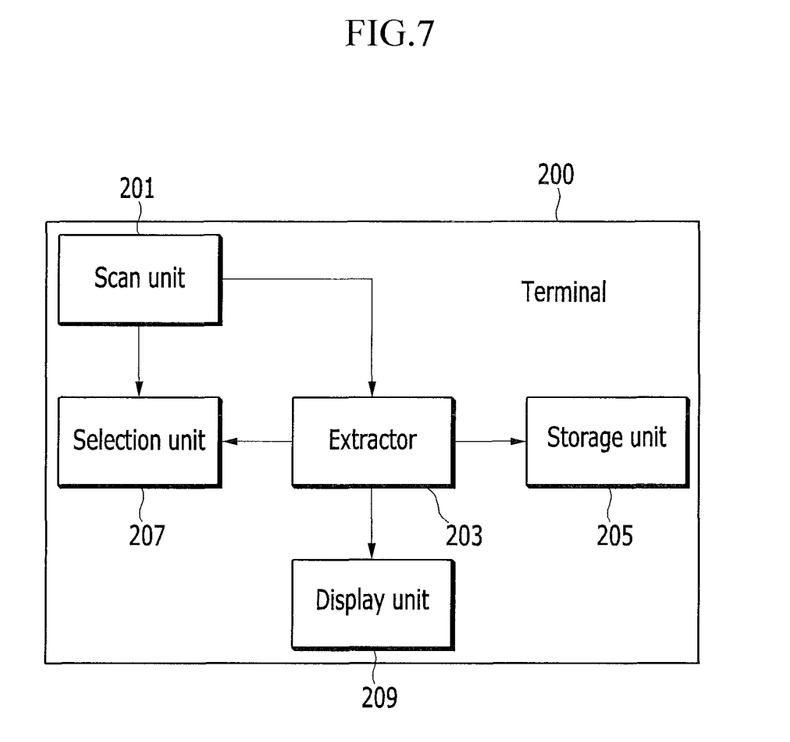
FIG. 7 is a block diagram illustrating a configuration of a terminal according to an exemplary embodiment of the present invention.
Figure 8:
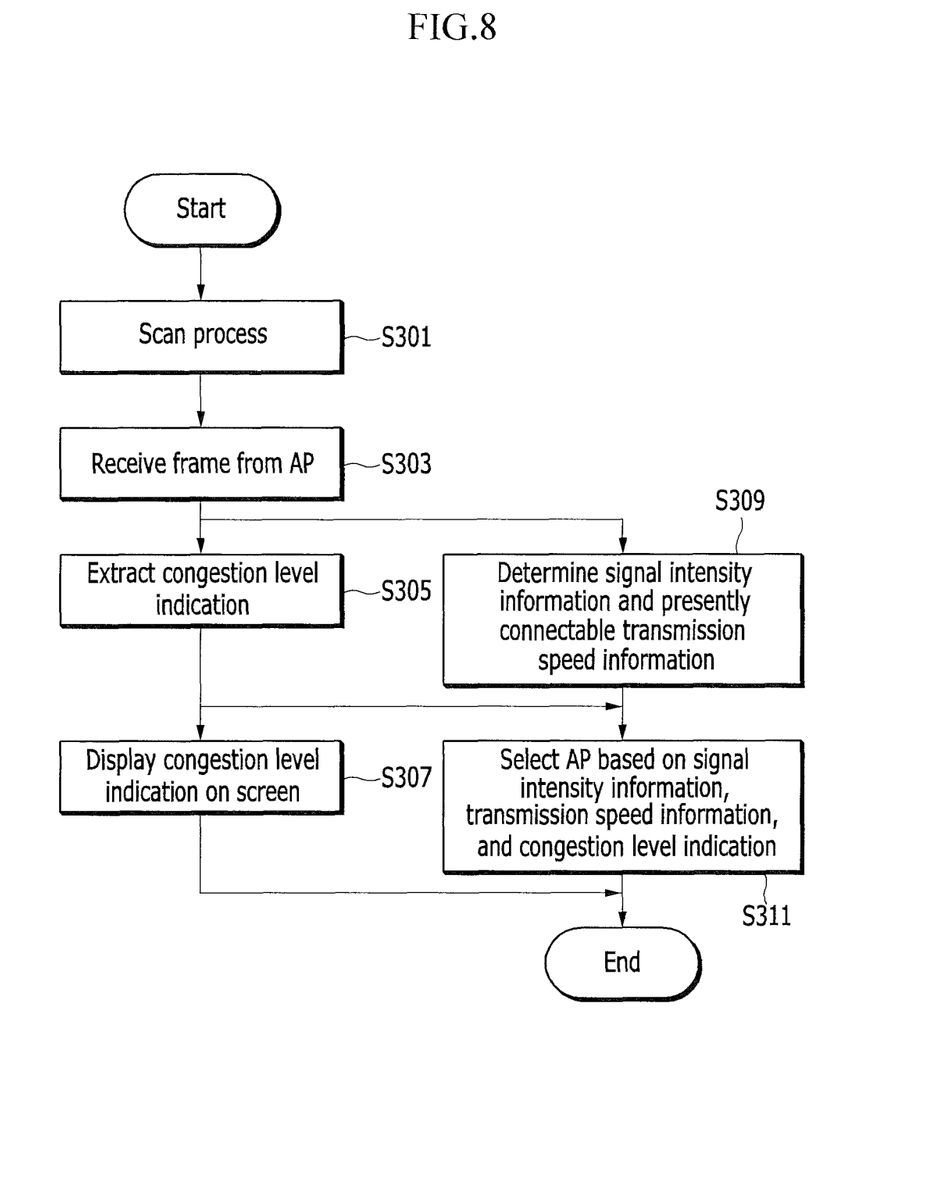
FIG. 8 is a flowchart illustrating a method of performing AP access control according to an exemplary embodiment of the present invention.
Figure 9:
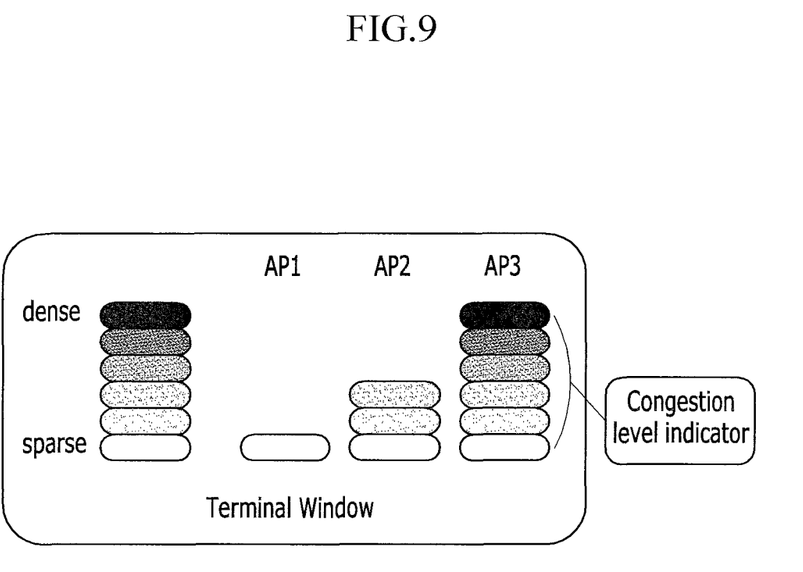
FIG. 9 illustrates a screen example of a terminal according to an exemplary embodiment of the present invention.

Further, FIG. 7 is a block diagram illustrating a configuration of a terminal according to an exemplary embodiment of the present invention, FIG. 8 is a flowchart illustrating a method of performing AP access control according to an exemplary embodiment of the present invention, and FIG. 9 illustrates a screen example of a terminal according to an exemplary embodiment of the present invention.

Referring to FIG. 7, the terminal 200 includes a scan unit 201, an extractor 203, a storage unit 205, a selection unit 207, and a display unit 209. An AP connection process of the terminal 200 is described with reference to FIG. 8.

When the terminal 200 attempts to connect to the wireless AP 100, the scan unit 201 searches for a peripheral AP to which the terminal 200 can access through a scan process (S301).

Here, the scan process is performed in all channels that the terminal 200 can access through a WLAN interface (not shown) of the terminal 200.

In this case, the scan unit 201 receives a frame from at least one AP 100 (S303).

Here, the frame may be a beacon frame that the AP 100 broadcasts. Alternatively, the frame may be a probe response frame that is received as a response to a probe request frame that the scan unit 201 transmits. Here, the probe request frame is an AP search request frame that is actively transmitted from the terminal 200 to the AP 100.

Thereafter, the extractor 203 extracts a congestion level indication (collision probability) of a transmission channel from a beacon frame or a probe response frame that is received at step S303 (S305).

Here, the extractor 203 determines the kind of reception frame from a frame control field and determines a transmission subject through SA and BSS ID field information. When it is determined that a frame received by the scan unit 201 was transmitted from the AP 100 and that the kind of the reception frame is a beacon frame or a probe response frame, the extractor 203 analyzes (or decodes) a frame body of the reception frame.

Referring to FIG. 3, the extractor 203 determines whether as an example, an "element ID" is 52, and recognizes an octet (e.g., 2 octets) that is recorded in a next length field as a congestion level (collision probability) and extracts the congestion level.

In this case, because a unit of a congestion level is expressed as 10e-6, if a decoding result of a congestion level field is 3546, a value of an actual congestion level becomes 0.003456.

In such a way, for all channels, the extractor 203 extracts a collision probability value, i.e., a congestion level from a frame that is received from the AP 100 and stores the congestion level in the storage unit 205.

Further, the extractor 203 displays the congestion level that is stored in the storage unit 205 on an AP (AP1, AP2, and AP3) basis on a screen of the terminal 200 through the display unit 209 (S307), as shown in FIG. 9.

Further, the extractor 203 determines signal intensity information and presently connectable transmission speed information from the frame that is received at step S303 (S309).

Thereafter, the selection unit 207 selects the AP 100 to connect based on the congestion level that is extracted at step S305, signal intensity information and the presently connectable transmission speed information that is determined at step S307 (S311).

For example, when it is assumed that signal intensity and transmission speed of each AP are equal based on a frame that is received from AP1, AP2, and AP3 of FIG. 1, the selection unit 207 compares congestion levels that are measured and transmitted by each of AP1, AP2, and AP3.

In this case, when the congestion level has a value in an order of AP1<AP2<AP3, the selection unit 207 selects AP1 having the lowest congestion level. Thereby, the quality of service occurring in the terminal 200 can be guaranteed.

According to an exemplary embodiment of the present invention, because a terminal can be connected to an AP by previously avoiding the AP having a large load by monitoring a congestion situation of the AP, a distribution effect of traffic that is applied to the AP and overall entire service quality that the terminal experiences can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An access point (AP) comprising:
a measuring unit that measures a congestion level of a transmission channel representing a collision probability between frames at a channel busy duration, wherein the measuring unit measures a transmission duration, a reception duration, and an idle duration of the transmission channel by a predetermined time interval according to a packet transmission state, and wherein the congestion level is measured by measuring a ratio that the reception duration occupies at a remaining time duration, except for the transmission duration at a predefined specific time duration of the transmission channel as the congestion level of the transmission channel; and
a broadcasting unit that includes the congestion level of the transmission channel into a beacon frame and broadcasts the beacon frame to a terminal that belongs within a service range of the AP, wherein the terminal:
extracts the congestion level of the transmission channel that is measured by the AP and determines signal intensity and transmission speed of the AP, and
selects the AP to connect to based on the congestion level of the transmission channel, wherein when the signal intensity and the transmission speed of a plurality of APs are equal, the AP selected out of the plurality of APs has a lowest congestion level.

2. An access point (AP) comprising:
a measuring unit that measures a congestion level of a transmission channel representing a collision probability between frames at a channel busy duration, wherein the measuring unit measures a transmission duration, a reception duration, and an idle duration of the transmission channel by a predetermined time interval according to a packet transmission state and wherein the congestion level is measured by measuring a ratio that the reception duration occupies at a remaining time duration, except for the transmission duration at a predefined specific time duration of the transmission channel as the congestion level of the transmission channel; and
a transmission unit that includes the congestion level of the transmission channel in a response frame to an AP search request frame that is received from a terminal and that transmits the response frame to the terminal, wherein the terminal:
extracts the congestion level of the transmission channel that is measured by the AP and determines signal intensity and transmission speed of the AP, and
selects the AP to connect to based on the congestion level of the transmission channel, wherein when the signal intensity and the transmission speed of a plurality of APs are equal, the AP selected out of the plurality of APs has a lowest congestion level.

3. The AP of claim 2, wherein the measuring unit measures a ratio of a busy time of the transmission channel that is measured for a predefined specific time period to the sum of the busy time and an idle time as the congestion level of the transmission channel.

4. A terminal comprising:
a scan unit that receives each frame from at least one access point (AP) through a scan process;
an extractor that extracts a congestion level of a transmission channel that is measured by the at least one AP that is included in the each frame,
wherein the at least one AP measures a transmission duration, a reception duration, and an idle duration of the transmission channel by a predetermined time interval according to a packet transmission state,
wherein the congestion level of the transmission channel represents a collision probability between frames at a channel busy duration and the congestion level is measured by measuring a ratio that the reception duration occupies at a remaining time duration, except for the transmission duration at a predefined specific time duration of the transmission channel as the congestion level of the transmission channel, and
wherein the extractor determines signal intensity and transmission speed of each of the at least one AP; and
a selection unit that selects the AP to connect from the at least one AP based on the congestion level of the transmission channel, wherein the selection unit selects an AP having lowest congestion level as the AP to connect to when the signal intensity and the transmission speed of a plurality of APs are equal.

5. The terminal of claim 4, further comprising a display unit that outputs a congestion level of each of the at least one AP that is extracted by the extractor to a screen.

6. The terminal of claim 4, wherein the scan unit receives a beacon frame in which each of the at least one AP broadcasts or a response frame to each AP search request that is transmitted to the at least one AP, and
the beacon frame or the response frame comprises the congestion level.

7. The terminal of claim 6, wherein the extractor extracts the congestion level from a newly defined information element of a frame body field of the beacon frame or the response frame.

8. A method of performing an access control of an access point (AP), the method comprising:
measuring, by the AP, a congestion level of a transmission channel representing a collision probability between frames at a channel busy duration, wherein the measuring, by the AP, comprises measuring a transmission duration, a reception duration, and an idle duration of the transmission channel by a predetermined time interval according to a packet transmission state; and
transmitting the congestion level of the transmission channel to a terminal, wherein the congestion level is measured by measuring a ratio that the reception duration occupies at a remaining time duration, except for the transmission duration at a predefined specific time duration of the transmission channel as the congestion level of the transmission channel, wherein the terminal, extracts the congestion level of the transmission channel from each of the frames and determining signal intensity and transmission speed of the AP through the each frame, and selects the AP to connect based on congestion level of the transmission channel, wherein when the signal intensity and the transmission speed of a plurality of APs are equal, the AP selected out of the plurality of the APs has a lowest congestion level.

9. The method of claim 8, wherein the transmitting of the congestion level comprises at least one of including the congestion level of the transmission channel in a beacon frame and broadcasting the beacon frame to the terminal belonging within a service range of the AP; and including the congestion level of the transmission channel in a response frame to an AP search request frame that is received from the terminal and transmitting the response frame to the terminal.

10. A method of performing access point (AP) access control of a terminal, the method comprising:

receiving each frame from at least one AP through a scan process for searching for an AP to which the terminal is to connect;

extracting a congestion level of a transmission channel that is measured by the at least one AP from each frame, wherein the at least one AP measures a transmission duration, a reception duration, and an idle duration of the transmission channel by a predetermined time interval according to a packet transmission state and wherein the congestion level of the transmission channel represents a collision probability between frames at a channel busy duration and the congestion level is measured by measuring a ratio that the reception duration occupies at a remaining time duration, except for the transmission duration at a predefined specific time duration of the transmission channel as the congestion level of the transmission channel, and wherein the extracting congestion level comprises extracting congestion level of the transmission channel from each frame and determining signal intensity and transmission speed of each of the at least one AP through the each frame; and selecting an AP to connect from the at least one AP based on the congestion level of the transmission channel wherein the selecting of an AP comprises selectin the AP having a lowest congestion level as an AP to connect to when the signal intensity and the transmission speed of a plurality of APs are equal.

11. The method of claim 10, wherein the extracting of the congestion level further comprises determining whether a transmission subject of a frame that is received from the at least one AP is an AP before extracting the congestion level of the transmission channel;

determining, if the transmission subject of the frame that is received from the at least one AP is an AP, a kind of the received frame and determining whether the received frame is a beacon frame or a response frame to an AP search request, and wherein the extracting of the congestion level of the transmission channel comprises extracting, if the received frame is a beacon frame or a response frame to an AP search request, the congestion level.

12. The method of claim 11, wherein the extracting of the congestion level of the transmission channel comprises analyzing a frame body field of the beacon frame or the response frame;

determining whether an element ID of an information element that is newly defined in the frame body field is a predefined value; and recognizing and extracting, if the element ID of an information element that is newly defined in the frame body field is a predefined value, an octet value that is recorded in a length field of the information element as the congestion level.

* * * * *